United States Patent
Rajendran et al.

(10) Patent No.: US 11,704,637 B2
(45) Date of Patent: Jul. 18, 2023

(54) SYSTEM AND METHOD TO ACCEPT THIRD-PARTY PAYMENTS

(71) Applicant: Capital One Services, LLC, McLean, VA (US)

(72) Inventors: Sriramprabhu Rajendran, Plano, TX (US); Janagaraj Ragupathy, Mckinney, TX (US); Adarsh Tandon, McLean, VA (US); Justine Thomas, Lewisville, TX (US); Jason E. Lines, Prosper, TX (US)

(73) Assignee: Capital One Services, LLC, McLean, VA (US)

( * ) Notice: Subject to any disclaimer, the term of this patent is extended or adjusted under 35 U.S.C. 154(b) by 202 days.

(21) Appl. No.: 16/822,882

(22) Filed: Mar. 18, 2020

(65) Prior Publication Data

US 2021/0295285 A1    Sep. 23, 2021

(51) Int. Cl.
| | |
|---|---|
| *G06Q 20/40* | (2012.01) |
| *G06Q 20/08* | (2012.01) |
| *G06Q 20/38* | (2012.01) |
| *H04L 9/40* | (2022.01) |

(52) U.S. Cl.
CPC ....... *G06Q 20/0855* (2013.01); *G06Q 20/389* (2013.01); *G06Q 20/407* (2013.01); *G06Q 20/4016* (2013.01)

(58) Field of Classification Search
CPC ............. G06Q 20/0855; G06Q 20/389; G06Q 20/4016; G06Q 20/407
See application file for complete search history.

(56) References Cited

U.S. PATENT DOCUMENTS

| | | | |
|---|---|---|---|
| 8,875,990 B2 | 11/2014 | Bishop et al. | |
| 8,965,957 B2* | 2/2015 | Barros | G06F 16/254 709/227 |
| 2003/0120593 A1* | 6/2003 | Bansal | H04L 65/765 705/36 R |
| 2009/0037982 A1* | 2/2009 | Wentker | G06Q 20/385 726/3 |
| 2012/0095873 A1 | 4/2012 | Narang et al. | |
| 2012/0197731 A1 | 8/2012 | Rampell et al. | |
| 2015/0332228 A1 | 11/2015 | Kimberg et al. | |

* cited by examiner

*Primary Examiner* — Bennett M Sigmond
*Assistant Examiner* — Bhavin D Shah
(74) *Attorney, Agent, or Firm* — Sterne, Kessler, Goldstein & Fox P.L.L.C.

(57) ABSTRACT

A real-time third-party payment system accepts payments to a lender from third-party merchants in real-time. The payment system may receive real-time payment information from the third-party, and various services within the payment system validate the customer account information, create a payment, store the payment in a database, and post the payment to a real-time ledger. The payment system may also receive an end-of-day file including file-based payment information. The file-based payment information may be verified against the real-time payments stored in the database. Upon validation, the payment system creates a file based payment and posts the file-based payment to a file-based ledger. The payment system may detect fraud, errors, and other discrepancies in real-time payments and make corrections based on settlement rules and self-healing rules provided by the third-party.

20 Claims, 6 Drawing Sheets

SYSTEM AND METHOD TO ACCEPT THIRD-PARTY PAYMENTS

BACKGROUND

Lenders, such as banks may provide loans to customers and require monthly payments to be made on the provided loans. Loans may be secured by some kind of collateral, such as a vehicle, real estate, or another type of asset. Customers may choose to make payments directly through the lender that provided the loan. Alternatively, customers may use a third-party to process payments made to the lender.

When a payment is made to a lender through a third-party, a delay may exist between the third-party receiving the payment and the lender posting the payment to the customer's account. The delay may include several days to process the payment, confirm with the lender that the payment has been received, and transfer the payment from the third-party to the lender. During this delay, the lender may not be aware that the payment is pending and take adverse action against the customer. For example, if a loan payment for a vehicle is made late, the lender may seize the vehicle in between the time that the payment is made and the time that the lender receives the payment.

Once an asset has been seized due to non-payment, the customer may decide to discontinue further payments. If possible, a lender may prefer to continue receiving payments, even late payments, rather than incur the cost of seizing and selling an asset in order to recoup losses. Therefore, it is in the best interest of both the lender and the customer to prevent unnecessary seizures that may result from delayed payments.

BRIEF SUMMARY

A method for processing a transaction request received through a third-party may include receiving account information, corresponding to a customer of a lender, from the third-party using a real-time service framework and validating the account information with the lender. The method may further include receiving payment information, associated with the account information, from the third-party using the real-time service framework. The method may further include creating a real-time payment, based on the payment information, according to a common payment format associated with the lender and storing the real-time payment in a database. The method may also include posting the real-time payment to a real-time electronic ledger, receiving an End of Day (EOD) file including a file-based payment, and performing EOD settlement. The EOD settlement may include verifying the file-based payment against the real-time payment stored in the database. The method may further include posting the file-based payment to a file-based electronic ledger.

The method may further include receiving a payment modification of the real-time payment through the one or more APIs, validating the payment modification by identifying the real-time payment corresponding to the payment modification in the database, and posting the payment modification to the real-time electronic ledger.

The performance of EOD settlement may further include performing self-healing in response to detecting a mismatch between the EOD file and the database. In response to self-healing failure, the method may revert the real-time payment from the real-time electronic ledger, and sending a notification to the third-party.

The method may further include receiving, from a new third-party, one or more selections identifying: a real-time service framework, one or more payment information fields of the one or more APIs, one or more payment channels including at least one of an interactive voice response channel, a mobile channel, or a web channel, at least one of the one or more payment channels as a discrepancy reconciliation channel, self-healing rules including a duplicate entry rule and a file transmission latency rule, an EOD file transmission time, and one or more settlement preferences. The method may further include configuring a vendor payments service based on the real-time service framework, the one or more payment information fields, the one or more payment channels, the discrepancy reconciliation channel, the self-healing rules, the EOD file transmission time, and the one or more settlement preferences.

The performing of EOD settlement may further include detecting fraudulent payments, and preventing posting of the fraudulent payments.

The method may further include storing the real-time payment in a data lake through an aggregator stream, analyzing the data lake, and perform, based on the analysis, one or more of: detecting fraud, detecting bad payment behavior, measuring key performance indicators, visualizing payment statistics by channel or by third-party, and generating alerts.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

The disclosed embodiments enable real-time processing of payments received by a lender, such as a bank, through third-party payment providers. Third-party payment providers may receive payments from customers of the lender and forward those payments to the lender.

One method of processing third-party payments includes receiving a batch file from the third-party payment provider. The batch file may include payment information, customer identifying information, and customer account information for one or more payments received from customers during a day by the third-party payment provider. The batch file may describe received payments in a format corresponding to the third-party payment provider. A batch file may be sent to the lender at a particular time each business day.

The lender may read the payment information from the batch file and verify that the customer account information is correct by comparing the batch file to internal customer account information. Payment records may be created and stored in a ledger when the customer account information is verified to be correct. The process of receiving, reading, verifying, and posting payments from the batch file may take some time and payments may not be posted to a customer's account until one or even more business days after the customer made the payment through the third-party payment provider.

The delay in batch payment processing is caused by the design of the communications network that financial institutions use to send financial transaction information to each other. The design of the communications network is an artifact of previously existing systems and the layers of technology that were added to enable electronic communication of financial transaction information. At its root, the communication system used by banks includes built in delays in the processing of payments.

One of the barriers to implementing real-time payments relates to the standardized usage of existing payment systems. Batch file payment systems may be slow, but they are reliable, and replacing them brings a risk of unexpected failures. The disclosed embodiments address this concern by augmenting the technological systems that rely on batch files with a combination of components that work together to enable real-time processing, notification and reporting of payments. These components work in combination to improve the existing technology of batch file-based payment systems. The improvements provide customers and financial institutions with the information necessary avoid costly actions that result directly from delays in communication.

The lender may receive real-time payments from a third-party payment provider through a real-time service framework. The real-time service framework may include SOAP, JAX-RPC, SOAP JAX-WS, REST, gRPC, GraphQL, Falcor, JSON-Pure, oData, or another real-time service framework or real-time Application Programing Interface (API). The disclosed embodiments describe using a real-time service framework to enable real-time payments while improving fraud detection, error detection and correction, and payment data analysis.

Figure 1:
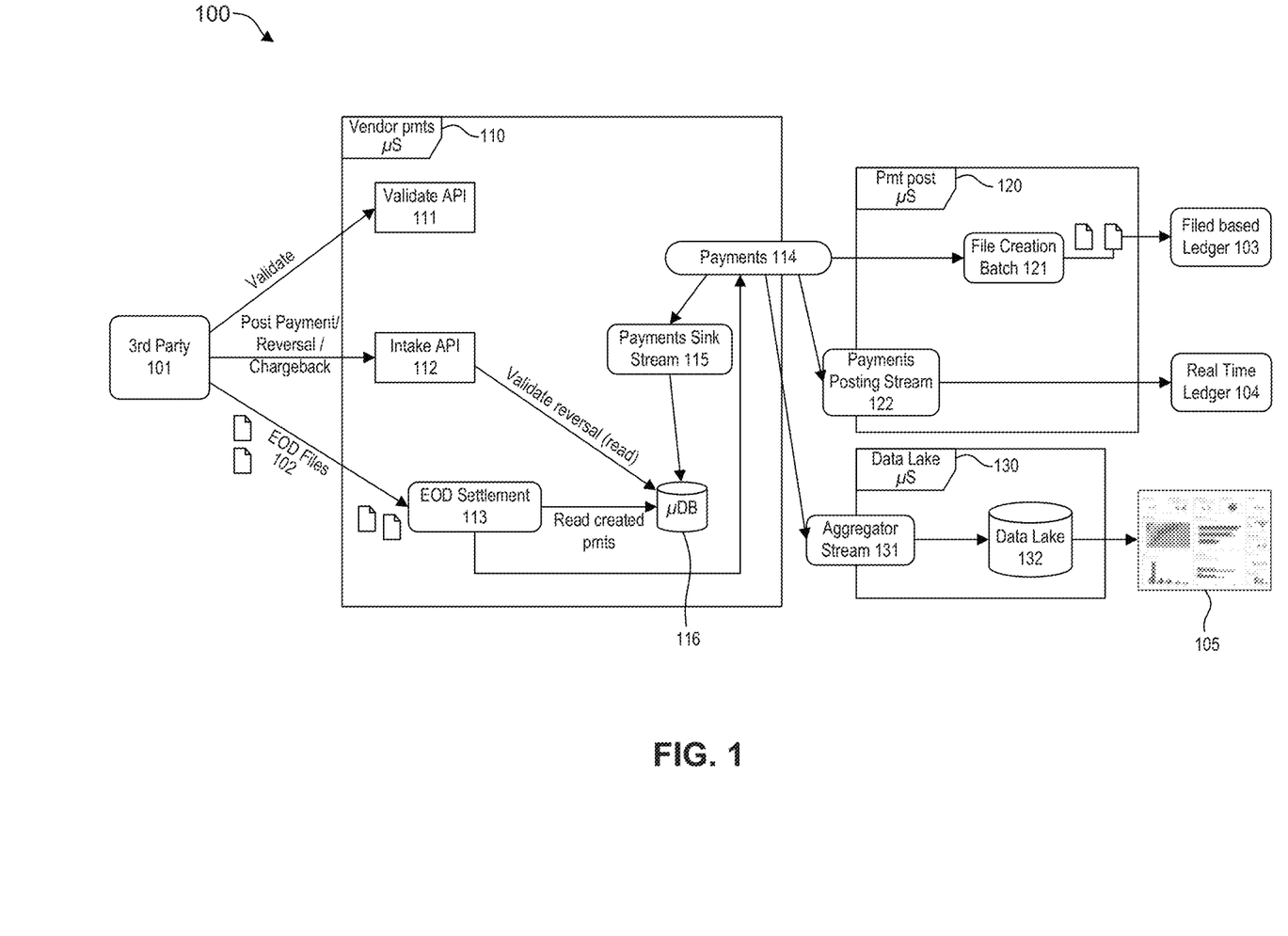
FIG. 1 is a block diagram illustrating a system for receiving third-party payments according to some disclosed embodiments.

FIG. 1 is a block diagram illustrating a system for receiving third-party payments according to some disclosed embodiments.

According to some embodiments, a real-time third-party payment system 100 may include one or more services. A service may include a microservice or a service configured to perform a subset of operations related to receiving, processing, and posting payments. The services of the real-time third-party payment system may include a vendor payments service 110, a payment posting service 120, and a data lake service 130.

The vendor payments service 110 may include a validate API 111, an intake API 112, and an end-of-day (EOD) settlement service. The validate API 111 may be configured to communicate with a third-party 101 and receive real-time payment information using a real-time service framework. The validate API 111 may be configured to validate customer account information with the customer's lender by accessing internal customer account records of the lender.

The intake API 112 may be configured to receive real-time payment information, or payment modifications from a third-party 101 using a real-time service framework. Payment modifications may include payment reversal, payment cancellation, or chargebacks. Once the vendor payments service 110 validates customer account information using the validate API 111 and receives real-time payment information through the intake API 112, the vendor payments service 110 may create one or more payments 114 and push the one or more payments 114 to various data streams. A payment may include a partial payment. The data streams may include a payments sink stream 115, a payments posting stream 122, and an aggregator stream 131.

The payments sink stream 115 may store real-time payments 114, created based on real-time payment information received through the intake API 112, in a database 116. The database 116 may include a microdatabase (μDB) configured to store records of payments 114 and allow the records to be read for verification by the intake API 112 and the EOD settlement service 113.

The payments posting service 120 posts payments 114, received from the vendor payments service 110, to the real-time ledger 104 using the payments posting stream 122. The real-time ledger 104 may include physical or virtual storage for recording payments 114. A ledger may store a number of transactions, including payments 114, that are applied to a customer's account with the lender. Posting of a payment to the real-time ledger may provide the lender with notice that a payment has been received. In response to receiving a payment, the lender may take appropriate action such as cancelling a repossession or sale of an asset or collateral.

Payments, partial payments, and payment modifications may all be processed in real time without manual intervention. The real-time third-party payment system 100 reduces processing time, human error, and operational costs. Canceled payments may also be reinstated after meeting validation requirements on payments and cancellations for the transaction. The real-time third-party payment system 100 allows customers may avoid adverse actions even if the adverse action is scheduled for the same day that the payment is made. As a non-limiting example, a lender may plan to repossess a vehicle, for which the customer owes a payment, at 2:00 p.m., and the customer may make a payment at 1:00 p.m. and avoid repossession of the vehicle.

The data lake service 130 may use the aggregator stream 131 to post payment 114 data to a data lake 132. The data lake 132 may provide access to aggregated payment 114 data for performing analysis 105 on payments 114. According to some embodiment, the data lake 132 may provide transparency into the payments made, allowing both third-parties and customers to view and verify the status of a payment. The data lake 132 may provide visibility to the payment data without requiring customers or third parties to gain access to the lender's payment records. The data lake service 130 may produce an audit trail, allowing payments, fraud, and payment modifications to be traced by customers and by third-parties.

The data lake 132 may be configured to allow tracking of payments from multiple third-parties in real time across all payment channels, including mobile, web, interactive voice response, retail or other payment channels. The data lake 132 may also enable businesses and third-parties to measure key performance indicators and performance of the real-time third-party payment system 100 at any point in time.

The EOD settlement service 113 may be configured to receive an EOD file 102 from the third-party 101. The EOD file 102 may include payment information related to payments received by the third-party 101 during a business day. A payment represented by the payment information in the EOD file 102 may be the same payment as a real-time payment received through the intake API 112 during the same business day. The third-party 101 may send real-time payment information to the vendor payments service 110 through the intake API 112 and also record the payment information in the EOD file 102 to be sent to the vendor payments service 110 at the end of the day.

The EOD settlement service 113 may verify file based payment information in the EOD file against the real-time payment information stored in the database 116. The EOD settlements service 113 may read, from the database 116, the payments 114 created based on real-time payment information and compare the stored payments to the payment information from the EOD file. The EOD settlement service 113 may be configured to automatically reconcile any differences between the EOD file and payments stored in the database 116. Reconciling differences may include performing self-healing including correcting payments, cancelling payments, flagging payments for further review, removing duplicate payments, or sending an alert or notification the third-party 101. The vendor payments service 110 may be configured to send an alert or notification to the third-party when the EOD settlement fails for any reason or if settlement is delayed because of network communication issues.

In response to successfully verifying the EOD payment information against the payments 114 stored in the database 116, the vendor payments service 110 may create file based payments 114 and send the file based payments 114 to the payment posting service 120. The payment posting service 120 may create a batch 121 of file based payments based on the file-based payments received from the vendor payments service 110. The payment posting service 120 may post the file-based payments to a file based ledger 103. The file based ledger 103 may include virtual or physical storage configured to store a number of transactions, including payments 114, that are applied to a customer's account with the lender. File based payments 114 may also be pushed to the aggregator stream 131 for storage in the data lake 132.

The real-time third-party payment system 100 is configured to use a common method for receiving and processing payments. The common method is applicable to all third-parties that use the system and flexible enough to allow for each third party's settlement preferences and preferred real-time service framework.

Figure 2:
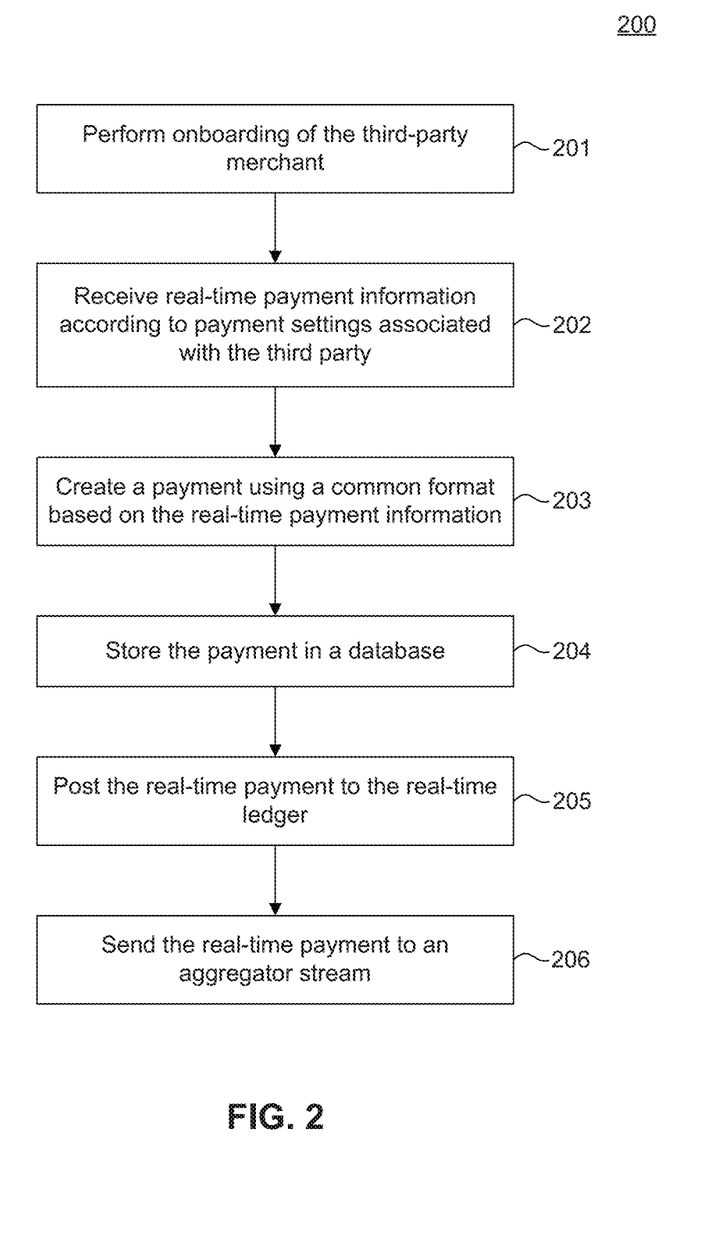
FIG. 2 is a flowchart illustrating a method for receiving a real-time third-party payment according to some disclosed embodiments.

FIG. 2 is a flowchart illustrating a method for receiving a real-time third-party payment according to some disclosed embodiments.

At step 201, the real-time third-party payment system 100 may perform onboarding of a third-party 101. Onboarding may include receiving information about the third-party 101 and receiving identification of preferences from the third-party 101, such as identification of a real-time service framework for receiving real-time payment information. The information received during onboarding may be stored in payment settings associated with the third-party 101. The process of onboarding is described in greater detail with reference to FIG. 5.

At step 202, the real-time third-party payment system 100 may receive real-time payment information according to payment settings associated with the third-party 101. Payment information may include customer identification, customer account information, a payment amount, or any other information related to the payment received from the customer by the third-party 101.

At step 203, the real-time third-party payment system 100 may create a payment using a common format based on the real-time payment information. Although different third-parties 101 may have different payment settings and preferences, the real-time third-party payment system 100 may be configured to translate the payment information received from third-parties into a common format for payments. The translation of the payment information into the common format may be performed based on payment settings associated with the third-party 101.

At step 204, the real-time third-party payment system 100 may store the payment in a database. The database may store all payments created by the real-time third-party payment system 100. The database may facilitate verification of payments, modification of payments and fraud detection. In the case of fraud, such as a payment being made without authorization, the bank from which the payment was drawn can initiate a chargeback. The real-time third-party payment system 100 may process payments, payment modifications, chargebacks and reinstatements in real time.

At step 205, the real-time third-party payment system 100 may post the real-time payment to a real-time ledger. The real-time ledger may store transactions corresponding to customers of the lender. Payments posted to the ledger may serve to notify the lender that a payment has been received. Based on payments posted to the real-time ledger, the lender may take appropriate action, such as cancelling the repossession or sale of an asset or collateral.

At step 206, the real-time third-party payment system 100 may send the real-time payment to an aggregator stream. The aggregator stream may store payments in a data lake. The data lake may allow performance of analysis on aggregated payments. The analysis may be used to detect suspicious payment activity or to determine performance metrics of the lender.

Figure 3:
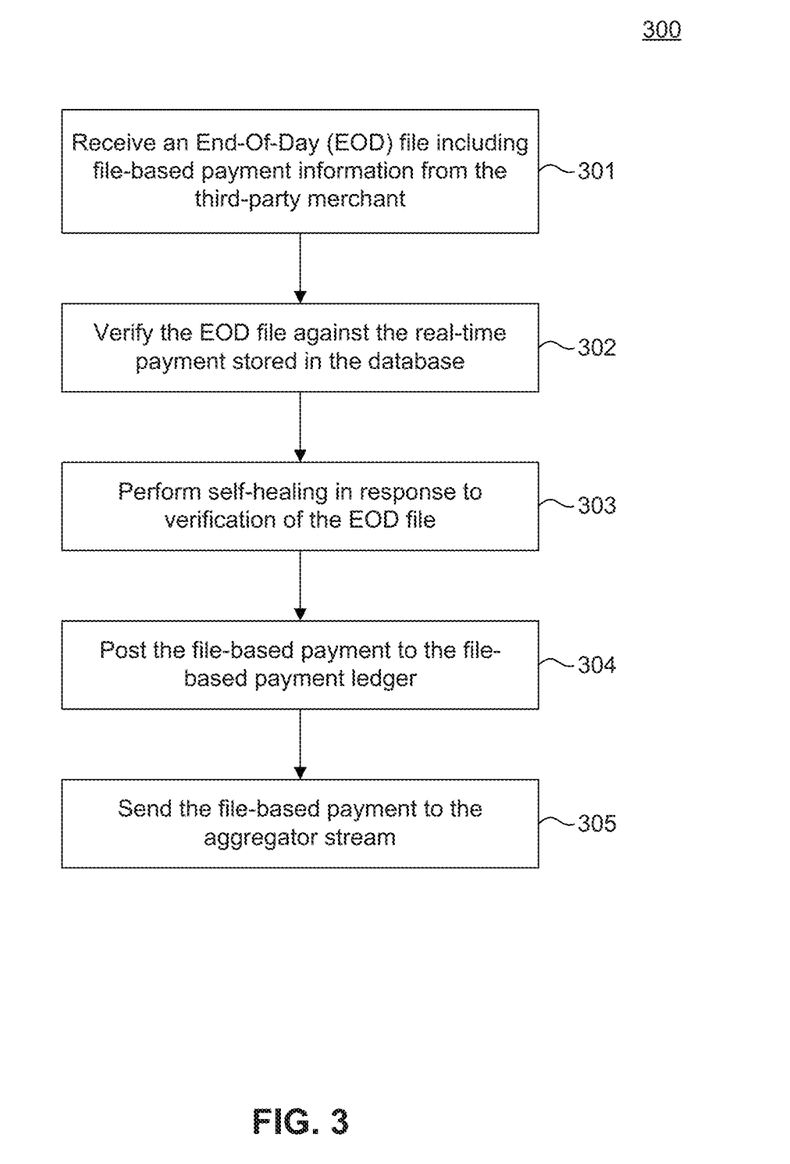
FIG. 3 is a flowchart illustrating a method for verifying real-time third-party payment using file-based payment information according to some disclosed embodiments.

FIG. 3 is a flowchart illustrating a method for verifying real-time third-party payment using file-based payment information according to some disclosed embodiments. After real-time payment information is received, the real-time third-party payment system 100 may receive an end-of-day (EOD) file including payment information corresponding to the real-time payments stored in the database. The real-time third-party payment system 100 may use the payment information included in the EOD file to verify the real-time payments.

At step 301, the real-time third-party payment system 100 may receive an EOD file including file based payment information from the third-party. The file based payment information included in the EOD file may correspond to the real-time payment information previously received by the real-time third-party payment system 100.

At step 302, the real-time third-party payment system 100 may verify the EOD file against the real-time payments stored in the database. Verification may include confirming that the file based payment information included in the EOD file matches the real-time payment information stored in the database.

At step 303, the real-time third-party payment system 100 may perform self-healing in response to verification of the EOD file against the real-time payments stored in the database. Self-healing may be performed in response to duplicate payment information, payment modifications, data entry errors, or fraudulent payments. Self-healing may include one or more of removing duplicate payments, correction of data entry errors, canceling payments, flagging payments for further review, or sending an alert or notification to the third-party 101. The alert or notification sent to the third party 101 may include a notice that the payment failed and a reason for the payment failure.

At step 304, the real-time third-party payment system 100 may post the file-based payments to the file based payment ledger. Once file based payments have been verified against the real-time payments stored in the database, the real-time third-party payment system 100 may post the file based payments to a file based payment ledger. The file based ledger and real-time ledger may include transactions corresponding to the same payments.

At step 305, the real-time third-party payment system 100 may send the file based payments to an aggregator stream. The aggregator stream may aggregate both real-time payments and file based payments and store all payments in a data lake. The data lake may make the payment data available for analysis to determine performance metrics or detect suspicious activity.

Figure 4:
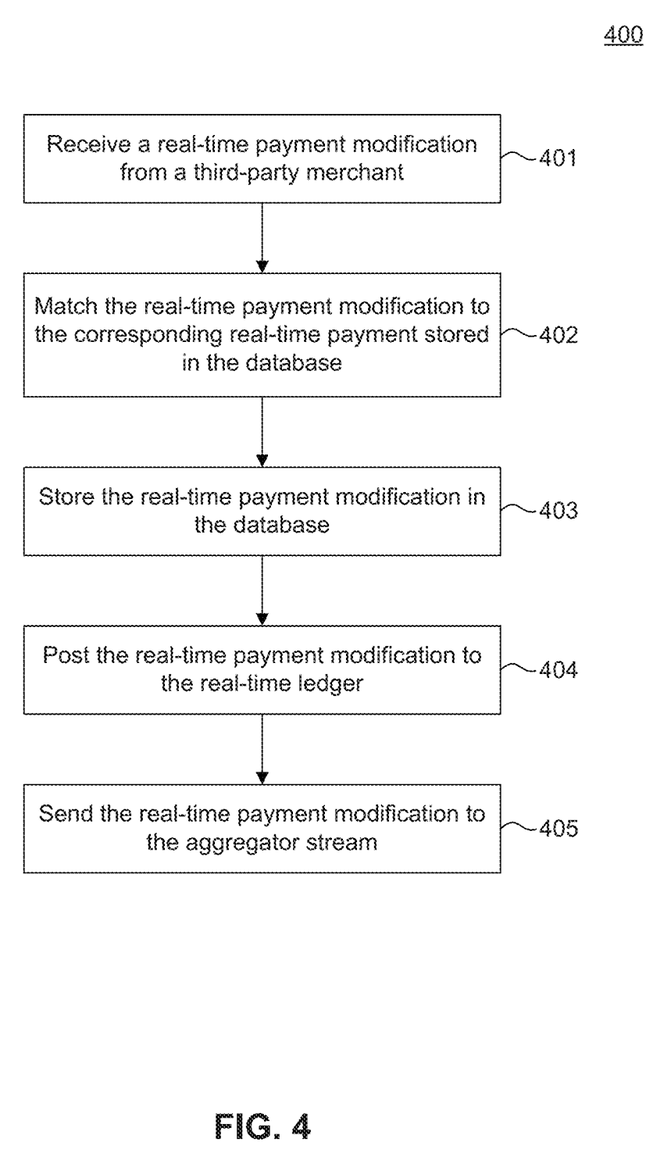
FIG. 4 is a flowchart illustrating a method for receiving a third-party payment modification according to some disclosed embodiments.

FIG. 4 is a flowchart illustrating a method for receiving a third-party payment modification according to some disclosed embodiments.

At step 401, the real-time third-party payment system 100 may receive a real-time payment modification from the third-party using the real-time service framework associated with the third-party 101. The real-time payment modification may include a payment cancellation, a payment reversal, or a chargeback. The real-time third-party payment system 100 may allow a payment reversal to be made using the same channel that was used for the original payment. The payment modification may be processed in real time.

At step 402, the real-time third-party payment system 100 may match the real-time payment modification to the corresponding real-time payment stored in the database. The real-time third-party payment system 100 may identify the payment stored in the database and verify that the received payment modification corresponds to an existing payment. In response to finding that the payment does not exist in the database, the real-time third-party payment system 100 may reject the payment modification.

At step 403, the real-time third-party payment system 100 may store the real-time payment modification in the database. According to some embodiments, the real-time third-party payment system 100 may modify the originally stored real-time payment in the database and store an indicator that the payment was modified. According to some embodiments, the real-time third-party payment system 100 may add a payment modification record to the database and link the payment record to the payment modification record.

At step 404, the real-time third-party payment system 100 may post the real-time payment modification to the real-time ledger. Posting the real-time payment modification to the real-time ledger may notify the lender that a payment modification has been received through a third-party.

At step 405, the real-time third-party payment system 100 may send the real-time payment modification to the aggregator stream 131. The aggregator stream 131 may store the real-time payment modification in a data lake 132.

Figure 5:
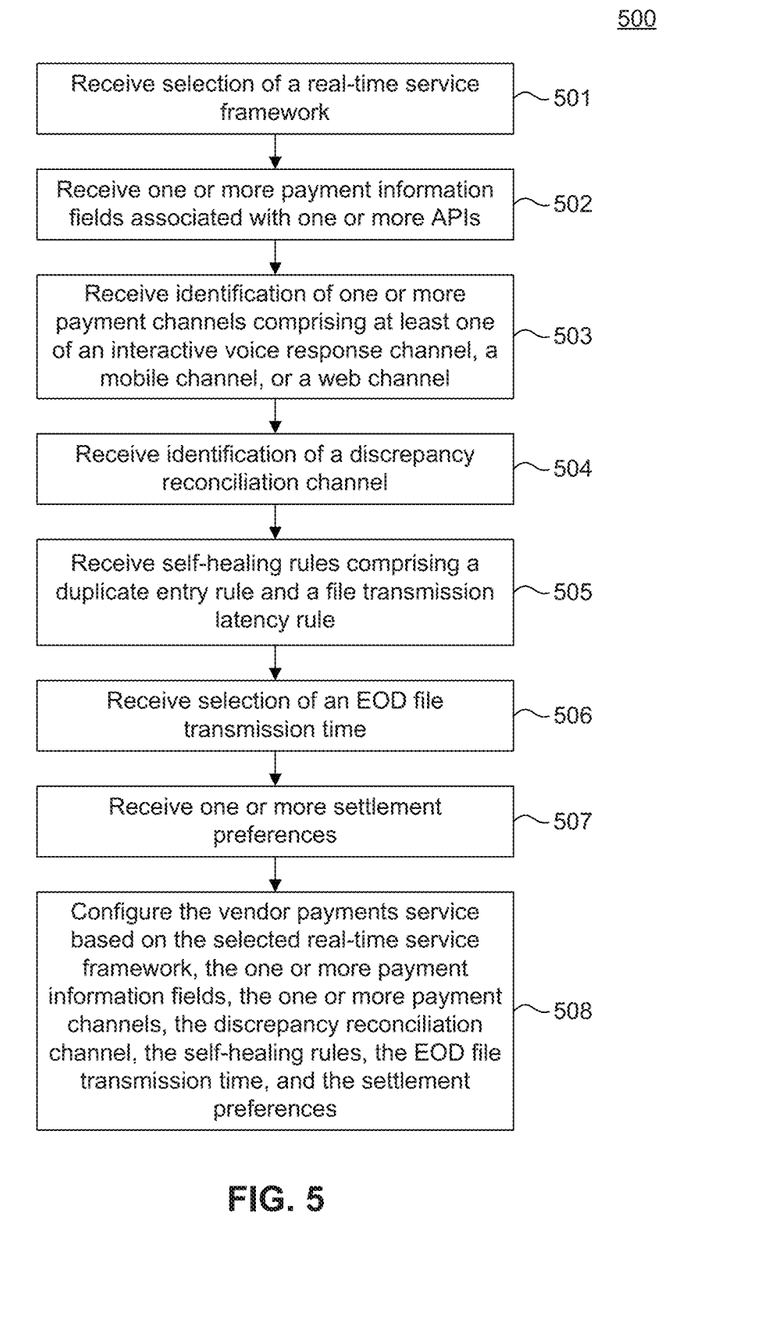
FIG. 5 is a flowchart illustrating a method of onboarding a new third-party payment provider according to some disclosed embodiments.

FIG. 5 is a flowchart illustrating a method of onboarding a new third-party payment provider according to some disclosed embodiments. The onboarding process may be performed in advance of receiving payments in order to establish payment preferences and communication protocols that allow real-time processing of payments from third-parties 101.

At step 501, the real-time third-party payment system 100 may receive selection of a real-time service framework from the third-party 101. The real-time service framework may allow the third-party 101 and the lender to coordinate communication for receiving payments in real-time. The real-time service framework may include SOAP, JAX-RPC, SOAP JAX-WS, REST, gRPC, GraphQL, Falcor, JSON-Pure, oData, or another real-time service framework or real-time Application Programing Interface (API).

At step 502, the real-time third-party payment system 100 may receive one or more payment information fields associated with one or more application programming interfaces (APIs). The one or more APIs may be configured to validate a customer's account information with a lender, and receive payment information from the third-party. The one or more APIs may be configured to be compatible with two or more different real-time service frameworks. According to some embodiments, an API (e.g., validate API 111. Intake API 112) may be configured to operate with two or more real-time service frameworks, and to select an appropriate real-time service framework based on the received selection of the third-party 101. According to some embodiments, the real-time third-party payment system 100 may include a first API configured to use a first real-time service framework and a second API configured to use a second real-time service framework different from the first real-time service framework.

At step 503, the real-time third-party payment system 100 may receive identification of one or more payment channels. A payment channel may include an interactive voice response channel, a mobile channel, a web channel, or any other communications channel by which payment information can be received by the lender through the third-party.

At step 504, the real-time third-party payment system 100 may receive identification of a discrepancy reconciliation channel. The discrepancy reconciliation channel may include a channel selected from among the one or more payment channels.

At step 505, the real-time third-party payment system 100 may receive self-healing rules, including a duplicate entry rule and a file transmission latency rule. Self-healing rules may be applied in response to a discrepancy between file based payment information and real-time payment information stored in the database 116.

At step 506, the real-time third-party payment system 100 may receive selection of End of Day (EOD) file transmission time. The EOD file transmission time may coordinate the transmission of the file based payment information from the third-party to the real-time third-party payment system 100. The real-time third-party payment system 100 may identify the third-party based, in part, on the time the EOD file transmission time.

At step 507, the real-time third-party payment system 100 may receive one or more settlement preferences. Settlement preferences may identify payment information that should be verified between file-based payment information and real-time payment information. Settlement preferences may influence the process of transferring funds from the customer to the lender. Settlement preferences may differ from one third-party to another. The real-time third-party payment system 100 may perform settlement of payments using the settlement preferences of the third-party through which the payment was received.

At step 508, the real-time third-party payment system 100 may configure the vendor payments service with the configuration information corresponding to the third-party being onboarded. The real-time third-party payment system 100 may configure the vendor payments service based on the selected real-time service framework, the one or more payment information fields, the one or more payment channels, the discrepancy reconciliation channel, the self-healing rules, the EOD file transmission time, and the settlement preferences.

Once onboarding for a third-party 101 is complete, the third-party 101 may communicate payment information, in real-time, to the real-time third-party payment system 100. Within minutes of onboarding, a newly onboarded account becomes available for making payments from any of the third-party's facilities. Onboarding may be performed for multiple different third-parties 101 and the real-time third-party payment system 100 may store configuration data related to each onboarded third-party 100.

Figure 6:
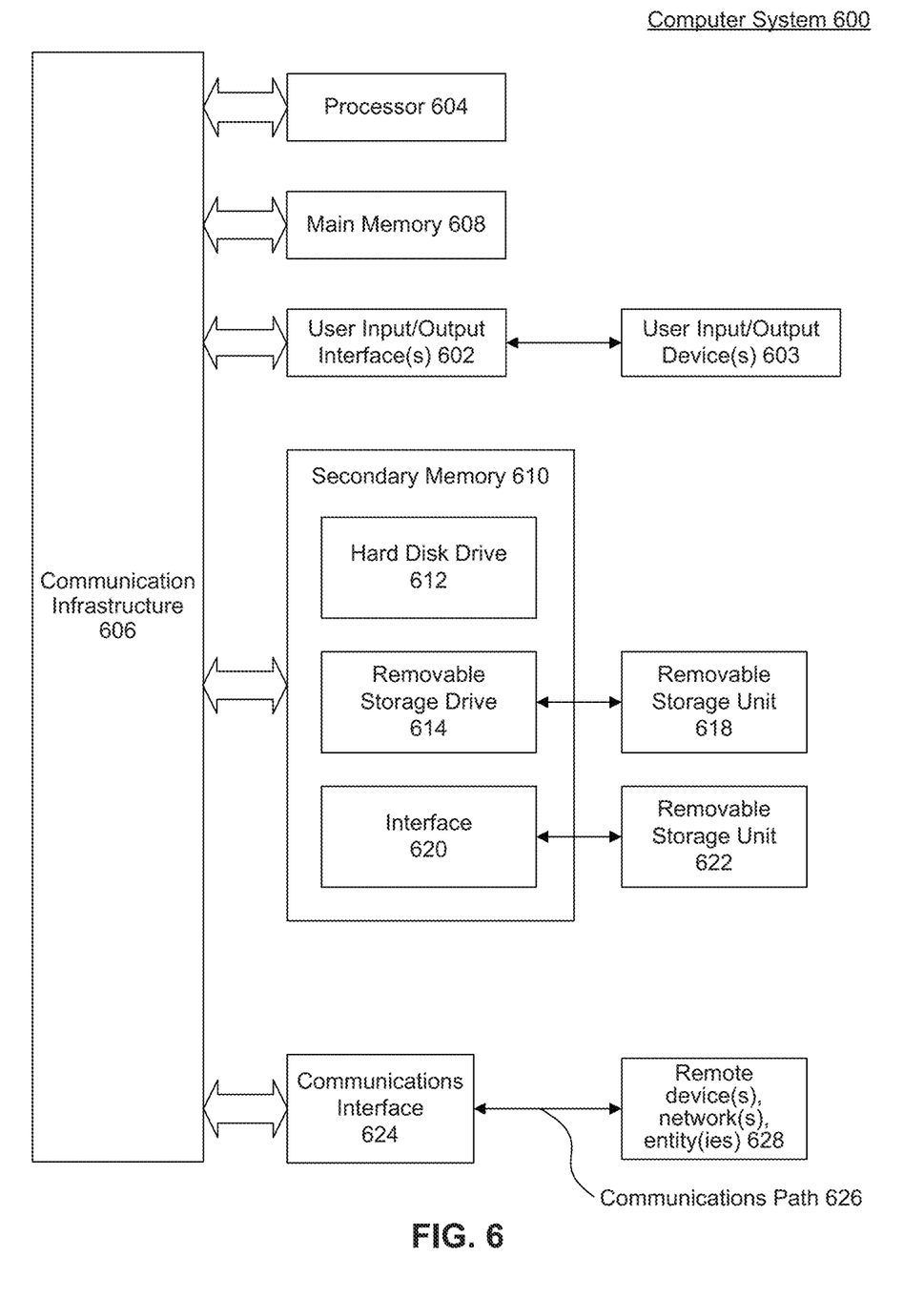
FIG. 6 is a block diagram of a non-limiting example computer system useful for implementing various embodiments disclosed herein.

FIG. 6 is a block diagram of a non-limiting example computer system useful for implementing various embodiments disclosed herein. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache and/or registers. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communications interface 624 may enable computer system 600 to communicate and interact with any combination of external devices, external networks, external entities, etc. (individually and collectively referenced by reference number 628). For example, communications interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premise software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A system for processing payments received through a third-party, the system comprising:
   a real-time electronic ledger configured to record a real-time payment;
   a file-based electronic ledger configured to record a file-based payment;
   one or more Application Programming Interfaces (APIs), configured to:
   validate a customer's account information with a lender, and
   receive payment information from the third-party, wherein the one or more APIs are configured to be compatible with two or more different real-time service frameworks;
   a vendor payments service configured to:
   receive the payment information from the third-party through the one or more APIs,
   create the real-time payment, based on the payment information, according to a common payment format associated with the lender,
   store the real-time payment in a database,
   receive an End of Day (EOD) file comprising the file-based payment, and
   perform EOD settlement, the EOD settlement comprising verifying the file-based payment against the real-time payment stored in the database;
   a payment posting service configured to:
   receive the real-time payment from the vendor payments service,
   post the real-time payment to the real-time electronic ledger,
   receive the EOD file from the vendor payments service, and
   post the file-based payment to the file-based electronic ledger;
   a data lake service configured to:
   provide access to aggregated payment data for performing analysis on payments,
   track the payments from multiple third-parties in real-time across multiple payment channels, and
   enable the multiple third-parties to measure performance indicators related to performance of the system at any point in time.

2. The system of claim 1, wherein the vendor payments service is further configured to:
   receive a payment modification of the real-time payment through the one or more APIs;
   validate the payment modification by identifying the real-time payment corresponding to the payment modification in the database; and
   send the payment modification to the payment posting service,
   wherein the payment posting service is further configured to post the payment modification to the real-time electronic ledger.

3. The system of claim 2, wherein the payment modification comprises a payment cancellation, a partial reversal, a chargeback, or a reinstatement.

4. The system of claim 1, wherein the performance of the EOD settlement further comprises:
   performing self-healing in response to detecting a mismatch between the EOD file and the database; and
   in response to self-healing failure, reverting the real-time payment from the real-time electronic ledger, and sending a notification to the third-party.

5. The system of claim 1, further comprising an onboarding service for configuring a new third-party for real-time payments, the onboarding service configured to:
   receive, from the new third-party, one or more selections identifying:
   real-time service framework;
   one or more payment information fields of the one or more APIs;
   one or more payment channels comprising at least one of an interactive voice response channel, a mobile channel, or a web channel;

at least one of the one or more payment channels as a discrepancy reconciliation channel;
self-healing rules comprising a duplicate entry rule, and a file transmission latency rule;
an EOD file transmission time; and
one or more settlement preferences; and
configure the vendor payments service to:
receive the payment information from the new third-party through an API, among the one or more APIs, compatible with the identified real-time service framework;
translate the payment information to the common payment format associated with the lender based on the one or more selections received from the new third-party; and
receive the EOD file at the EOD file transmission time; and
perform the EOD settlement according to the one or more settlement preferences of the new third-party.

6. The system of claim 1, wherein the performance of the EOD settlement further comprises:
detecting fraudulent payments; and
preventing posting of the fraudulent payments.

7. The system of claim 1, further comprising:
an aggregator service configured to store, in a data lake, the real-time payment, and the posting of the real-time payment,
wherein, the aggregator service is configured to receive the real-time payment and the posting of the real-time payment from the vendor payments service through an aggregator stream.

8. The system of claim 7, wherein the aggregator service is further configured to analyze the data lake; and
perform, based on the analysis, one or more of: detecting fraud, detecting bad payment behavior, measuring key performance indicators, visualizing payment statistics by channel or by third-party, and generating alerts.

9. A method for processing a transaction request received through a third-party, the method comprising:
receiving account information, corresponding to a customer of a lender, from the third-party using a real-time service framework;
validating the account information with the lender;
receiving payment information, associated with the account information, from the third-party using the real-time service framework;
creating a real-time payment, based on the payment information, according to a common payment format associated with the lender;
storing the real-time payment in a database;
posting the real-time payment to a real-time electronic ledger;
receiving an End of Day (EOD) file comprising a file-based payment;
performing EOD settlement, the EOD settlement comprising verifying the file-based payment against the real-time payment stored in the database;
posting the file-based payment to a file-based electronic ledger;
providing access to aggregated payment data for performing analysis on payments;
tracking the payments from multiple third-parties in real-time across multiple payment channels; and
enabling the multiple third-parties to measure performance indicators related to performance of the processing of the transaction request at any point in time.

10. The method of claim 9, further comprising:
receiving a payment modification of the real-time payment through one or more APIs;
validating the payment modification by identifying the real-time payment corresponding to the payment modification in the database; and
posting the payment modification to the real-time electronic ledger.

11. The method of claim 9, wherein the performance of the EOD settlement further comprises:
performing self-healing in response to detecting a mismatch between the EOD file and the database; and
in response to self-healing failure, reverting the real-time payment from the real-time electronic ledger, and sending a notification to the third-party.

12. The method of claim 9, further comprising:
receiving, from a new third-party, one or more selections identifying:
a real-time service framework;
one or more payment information fields of one or more APIs;
one or more payment channels comprising at least one of an interactive voice response channel, a mobile channel, or a web channel;
at least one of the one or more payment channels as a discrepancy reconciliation channel;
self-healing rules comprising a duplicate entry rule, and a file transmission latency rule;
an EOD file transmission time; and
one or more settlement preferences; and
configuring a vendor payments service based on the real-time service framework, the one or more payment information fields, the one or more payment channels, the discrepancy reconciliation channel, the self-healing rules, the EOD file transmission time, and the one or more settlement preferences.

13. The method of claim 9, wherein the performing of the EOD settlement further comprises:
detecting fraudulent payments; and
preventing posting of the fraudulent payments.

14. The method of claim 9, further comprising:
storing the real-time payment in a data lake through an aggregator stream;
analyzing the data lake; and
performing, based on the analysis, one or more of: detecting fraud, detecting bad payment behavior, measuring key performance indicators, visualizing payment statistics by channel or by third-party, and generating alerts.

15. A non-transitory computer readable device storing instructions that, when executed by a processor, cause the processor to perform method steps of:
receiving account information, corresponding to a customer of a lender, from a third-party using a real-time service framework;
validating the account information with the lender;
receiving payment information, associated with the account information, from the third-party using the real-time service framework;
creating a real-time payment, based on the payment information, according to a common payment format associated with the lender;
storing the real-time payment in a database;
posting the real-time payment to a real-time electronic ledger;
receiving an End of Day (EOD) file comprising a file-based payment;

performing EOD settlement, the EOD settlement comprising verifying the file-based payment against the real-time payment stored in the database;

posting the file-based payment to a file-based electronic ledger;

providing access to aggregated payment data for performing analysis on payments;

tracking the payments from multiple third-parties in real-time across multiple payment channels; and enabling the multiple third-parties to measure performance indicators related to performance of the processor at any point in time.

16. The non-transitory computer readable device of claim 15 storing instructions that, when executed by the processor, cause the processor to further perform the method steps of:

receiving a payment modification of the real-time payment through one or more APIs;

validating the payment modification by identifying the real-time payment corresponding to the payment modification in the database; and posting the payment modification to the real-time electronic ledger.

17. The non-transitory computer readable device of claim 15 storing instructions that, when executed by the processor, cause the processor to further perform the method steps of:

performing self-healing in response to detecting a mismatch between the EOD file and the database; and in response to self-healing failure, reverting the real-time payment from the real-time electronic ledger, and sending a notification to the third-party.

18. The non-transitory computer readable device of claim 15 storing instructions that, when executed by the processor, cause the processor to further perform the method steps of:

receiving, from a new third-party, one or more selections identifying:
  a real-time service framework;
  one or more payment information fields of one or more APIs;
  one or more payment channels comprising at least one of an interactive voice response channel, a mobile channel, or a web channel;
  at least one of the one or more payment channels as a discrepancy reconciliation channel;
  self-healing rules comprising a duplicate entry rule, and a file transmission latency rule;
  an EOD file transmission time; and
  one or more settlement preferences; and configuring a vendor payments service based on the real-time service framework, the one or more payment information fields, the one or more payment channels, the discrepancy reconciliation channel, the self-healing rules, the EOD file transmission time, and the one or more settlement preferences.

19. The non-transitory computer readable device of claim 15 storing instructions that, when executed by the processor, cause the processor to further perform the method steps of:

detecting fraudulent payments; and preventing posting of the fraudulent payments.

20. The non-transitory computer readable device of claim 15 storing instructions that, when executed by the processor, cause the processor to further perform the method steps of:

storing the real-time payment in a data lake through an aggregator stream;

analyzing the data lake; and performing, based on the analysis, one or more of: detecting fraud, detecting bad payment behavior, measuring key performance indicators, visualizing payment statistics by channel or by third-party, and generating alerts.

* * * * *